(12) United States Patent
Kim et al.

(10) Patent No.: US 12,205,619 B2
(45) Date of Patent: Jan. 21, 2025

(54) DISPLAY DEVICE FOR DISPLAYING A PREVIEW VIDEO BASED ON PAST PLAYBACK INFORMATION

(71) Applicant: LG ELECTRONICS INC., Seoul (KR)

(72) Inventors: Yunam Kim, Seoul (KR); Sinan Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 185 days.

(21) Appl. No.: 17/601,504

(22) PCT Filed: Jul. 16, 2019

(86) PCT No.: PCT/KR2019/008739
§ 371 (c)(1),
(2) Date: Oct. 5, 2021

(87) PCT Pub. No.: WO2021/010511
PCT Pub. Date: Jan. 21, 2021

(65) Prior Publication Data
US 2022/0157345 A1    May 19, 2022

(51) Int. Cl.
| | |
|---|---|
| *H04N 21/482* | (2011.01) |
| *G11B 27/30* | (2006.01) |
| *G11B 27/32* | (2006.01) |
| *H04N 5/93* | (2006.01) |
| *H04N 9/82* | (2006.01) |
| *H04N 21/8549* | (2011.01) |

(52) U.S. Cl.
CPC ........ *G11B 27/3081* (2013.01); *G11B 27/326* (2013.01); *H04N 5/93* (2013.01); *H04N 9/8227* (2013.01); *H04N 21/482* (2013.01); *H04N 21/8549* (2013.01)

(58) Field of Classification Search
CPC .... G11B 27/3081; G11B 27/326; H04N 5/93; H04N 9/8227; H04N 21/482; H04N 21/8549
See application file for complete search history.

(56) References Cited

U.S. PATENT DOCUMENTS

| | | | | |
|---|---|---|---|---|
| 8,078,603 | B1 * | 12/2011 | Chandratillake | G06F 16/738 |
| | | | | 707/706 |
| 8,386,934 | B2 * | 2/2013 | Takakura | G11B 27/34 |
| | | | | 715/838 |

(Continued)

FOREIGN PATENT DOCUMENTS

| | | |
|---|---|---|
| EP | 1 746 600 A1 | 1/2007 |
| EP | 2 831 773 A2 | 8/2013 |

(Continued)

*Primary Examiner* — Alvin H Tan
(74) *Attorney, Agent, or Firm* — Birch, Stewart, Kolasch & Birch, LLP

(57) ABSTRACT

A display device including a display; and a controller configured to receive a request to display a video list including at least one video item corresponding to a video, determine an existence of last playback information indicating a last playback time of the video, and in response to the existence of the last playback information, control the display to display the at least one video item with a first thumbnail representing a first preview video based on the last playback time of the video.

10 Claims, 12 Drawing Sheets

(56) References Cited

U.S. PATENT DOCUMENTS

| | | | | |
|---|---|---|---|---|
| 8,621,514 | B2* | 12/2013 | Yao | H04N 21/84 |
| | | | | 725/44 |
| 9,836,207 | B2* | 12/2017 | Langholz | G06F 3/04847 |
| 10,180,775 | B2 | 1/2019 | Laska et al. | |
| 10,347,294 | B2* | 7/2019 | Yang | G11B 27/28 |
| 2002/0054049 | A1* | 5/2002 | Toyoda | G11B 19/022 |
| 2003/0123853 | A1* | 7/2003 | Iwahara | G11B 27/034 |
| | | | | 386/241 |
| 2006/0029374 | A1* | 2/2006 | Park | H04N 21/47 |
| | | | | 386/243 |
| 2009/0249208 | A1 | 10/2009 | Song et al. | |
| 2011/0116769 | A1* | 5/2011 | Sugiyama | G11B 27/326 |
| | | | | 386/E5.028 |
| 2013/0080895 | A1* | 3/2013 | Rossman | H04N 21/234381 |
| | | | | 715/720 |
| 2013/0132543 | A1* | 5/2013 | Langer | G06F 16/748 |
| | | | | 709/223 |
| 2016/0294894 | A1* | 10/2016 | Miller | G06F 16/24578 |

FOREIGN PATENT DOCUMENTS

| | | | |
|---|---|---|---|
| JP | 2008-303746 | A | 11/2006 |
| KR | 10-2009-0021524 | A | 3/2009 |
| KR | 10-2011-0026808 | A | 3/2011 |
| KR | 10-1454025 | B1 | 11/2014 |
| KR | 10-2015-0092485 | A | 8/2015 |
| KR | 10-2017-0036300 | A | 4/2017 |
| KR | 10-1883373 | B1 | 7/2018 |

\* cited by examiner

FIG. 12
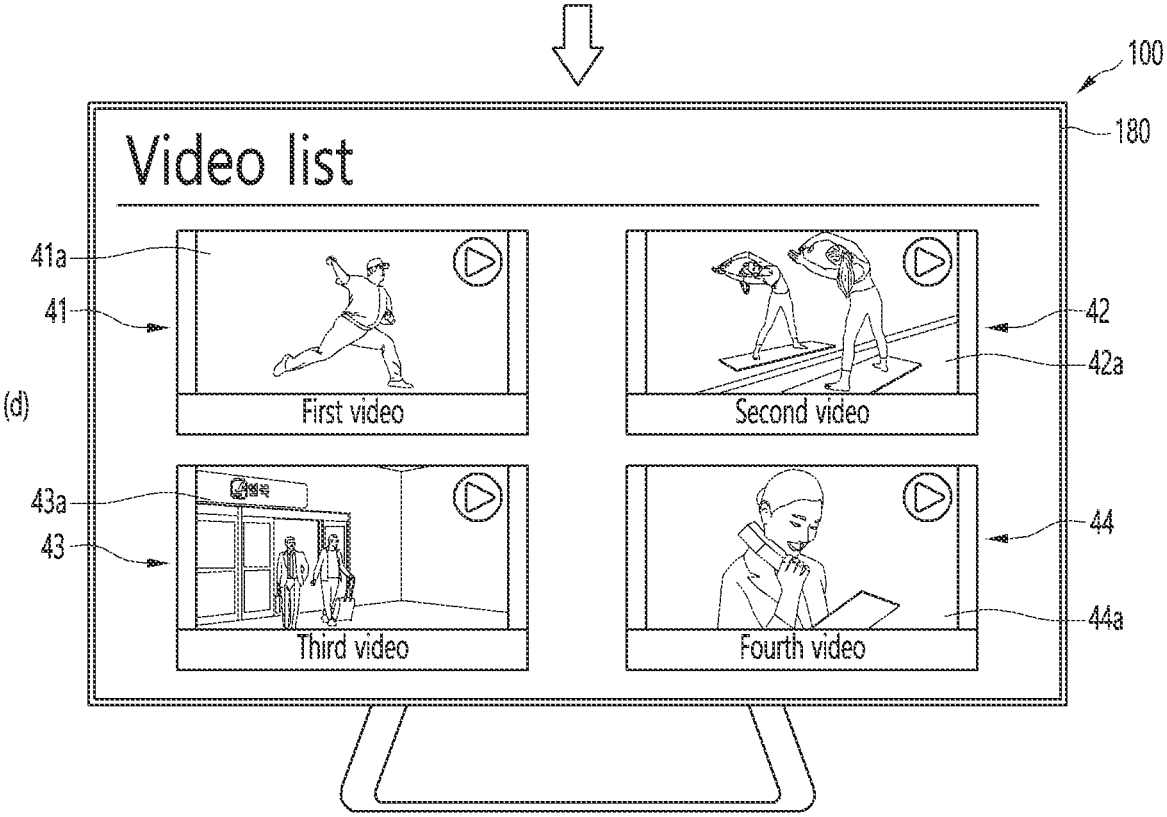

DISPLAY DEVICE FOR DISPLAYING A PREVIEW VIDEO BASED ON PAST PLAYBACK INFORMATION

CROSS-REFERENCE TO RELATED APPLICATION

This Application is the National Phase of PCT International Application No. PCT/KR2019/008739 filed on Jul. 16, 2019, which is hereby expressly incorporated by reference into the present application.

BACKGROUND OF THE INVENTION

Field of the Invention

The present disclosure relates to a display device, and more particularly, to a method of displaying a video list on a display device.

Discussion of the Related Art

Recently, display devices may display a video received through an antenna as well as a video of an external device connected wiredly/wirelessly. For example, display devices may display a video stored in a storage medium such as a universal serial bus (USB). Accordingly, users can more conveniently view the stored in the storage medium through a large screen of the display devices.

In addition, when displaying a list of videos (e.g., avi files, mp4 files, etc.) stored in storage mediums, display devices may display a frame of each video as a thumbnail so that users can easily recognize each of the videos. For example, display devices may extract a first frame of a video or a frame corresponding to a certain position of a video and use the extracted frame as a thumbnail.

However, since the beginning of a video is a black image in many cases, when a first frame of the video is used as a thumbnail, the thumbnail cannot properly deliver the contents of the video. In addition, when a frame corresponding to a certain position of the video is used as a thumbnail, a video in a fixed position is always used, so the thumbnail is often insufficient to represent each video. That is, in many cases, the thumbnails of a video list of the related art do not imply the contents of each video to the user. In addition, because each frame to be used as a thumbnail has to be stored internally, there is a problem of inefficiency in terms of performance of the device.

SUMMARY OF THE INVENTION

An aspect of the present disclosure provides a display device for displaying a thumbnail to represent a corresponding video without storing some frames extracted from the video.

Another aspect of the present disclosure provides a display device for displaying a list of videos so that thumbnails of each video item represent the corresponding video.

Another aspect of the present disclosure provides a display device for improving a screen switching speed when a display screen of a video list is switched to a playing screen of a specific video.

A display device according to an embodiment of the present invention comprises a display configured to display a video list including at least one video item, and a controller configured to control the display to display a preview video which is a partial section of video corresponding to the video item, as a thumbnail of the video item.

The controller is configured to obtain the preview video based on past playback information.

The controller is configured to control the display to display, as a thumbnail, the preview video played for a predetermined time based on a last playback time point of the video.

The controller is configured to obtain the preview video based on a last playback time point of the video when past playback information of the video exists.

The controller is configured to obtain the preview video based on a preset playback position of the video when the past playback information of the video does not exist.

The controller is configured to control the display to display the preview video as the thumbnail when a pointer is located in the video item, and to display, as a thumbnail, one scene of the preview video when a pointer is not located in the video item.

The controller is configured to play the video from a time point corresponding to the preview video, when the video item is selected by the pointer.

The controller is configured to switch a playback mode of the preview video from a thumbnail mode to a full screen mode, when the video item is selected by the pointer.

The controller is configured to control the display to display, as the thumbnail, a first scene of the preview video when a pointer is not located in the video item.

The controller is configured to change the preview video when a last playback time point of the video is changed.

The controller is configured to change the thumbnail when a last playback time point of the video is changed.

When the video is stopped during playback, the controller is configured to obtain the preview video based on a last playback time point of the video, and when the video is not played or playing of the video is completed, the controller is configured to obtain the preview video based on a preset playback position of the video.

The controller is configured to obtain, as the preview video, any one of a first video played from a time before a predetermined time from the last playback time to the last playback time point, a second video in which the last playback time is played in the middle thereof and played for a predetermined time, and a third video played from the last playback time point for a predetermined time.

The controller is configured to obtain an video produced for a predetermined time from a playback position corresponding to a set ratio in a total playback time of the video.

The controller configured to control the display to display, in the video item, at least one of a first icon for playing the video from the beginning and a second icon for playing the video from the preview video.

Advantageous Effects

According to an embodiment of the present disclosure, since a partial section of a video is displayed as a thumbnail of a video item, it is not necessary to store a specific frame for the thumbnail, and thus separate storage space is not required.

In addition, since a preview video based on past playback information of the video is displayed as a thumbnail, the thumbnail secures representativeness of the video and the user may more easily recognize the contents of the video through the thumbnail. In particular, when the last playback time point is displayed as a thumbnail, the user may more easily recall the contents of the video through the thumbnail.

In addition, since a partial section of the video is played as a thumbnail, the user may easily recognize that it is a dynamic media file through the thumbnail.

In addition, when a video item is selected, a preview video being played as a thumbnail is displayed as a whole screen to play the video, a screen switching speed may be increased and the video may be played more smoothly.

BRIEF DESCRIPTION OF THE DRAWINGS

FIG. 12 is an exemplary view illustrating a method for changing a thumbnail by a display device when a video is stopped during playback according to an embodiment of the present disclosure.

DETAILED DESCRIPTION OF THE EMBODIMENTS

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
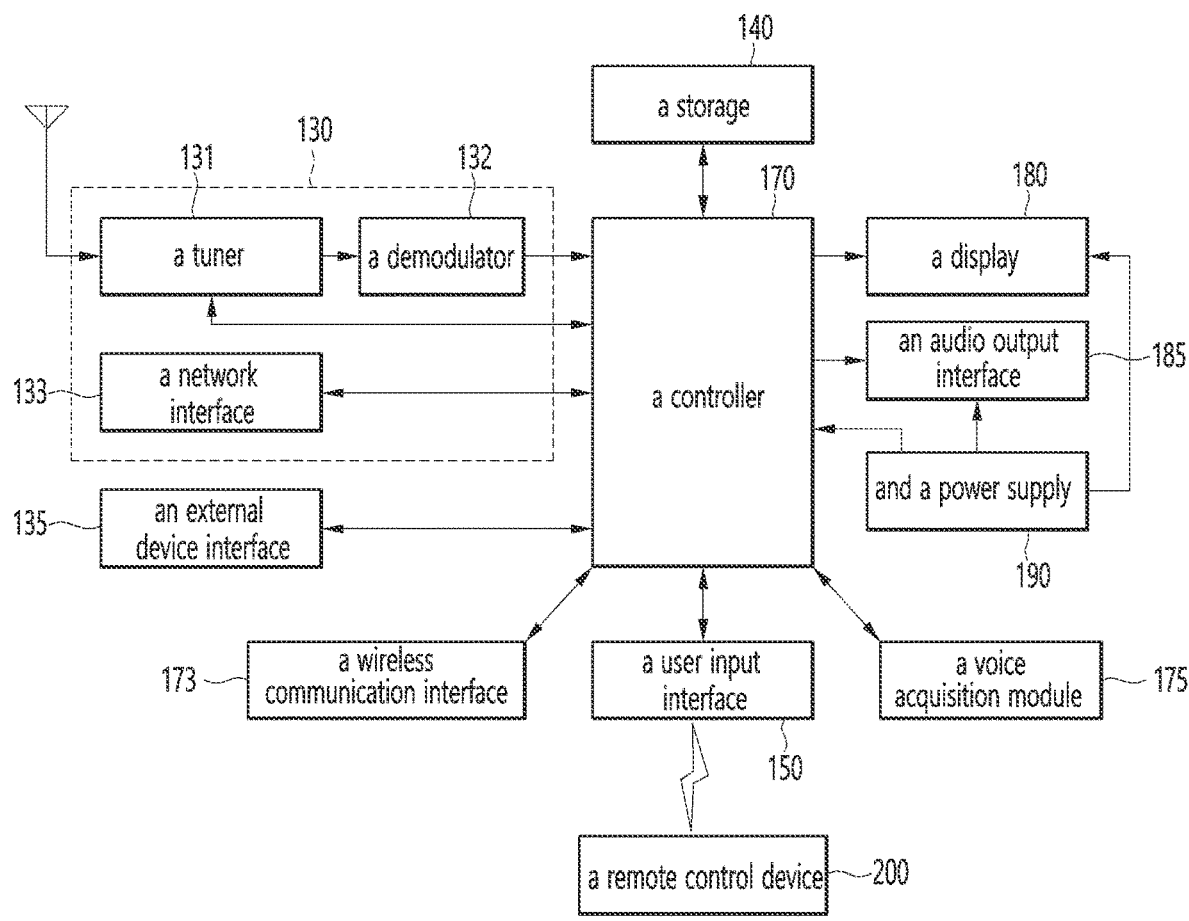
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
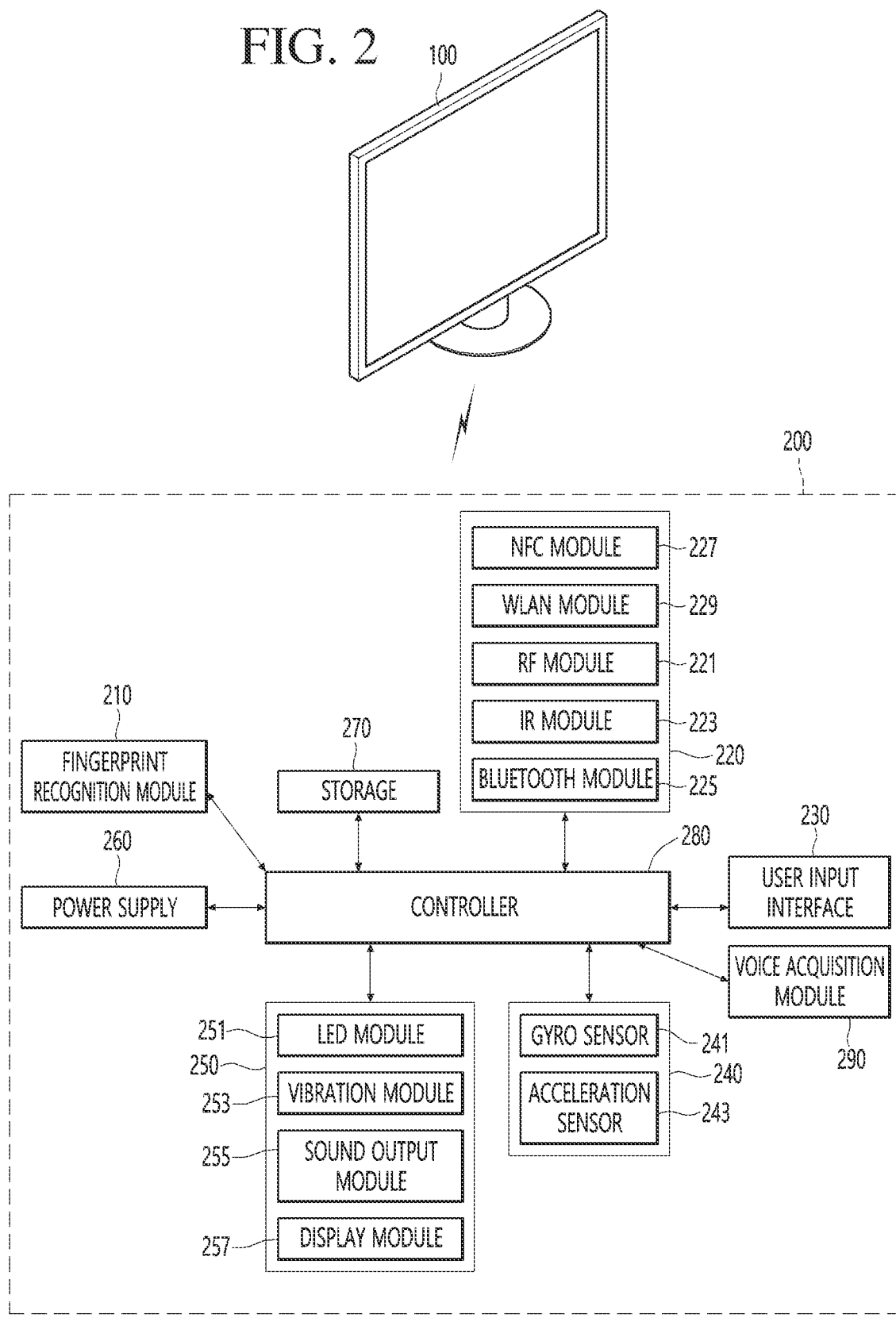
FIG. 2 is a block diagram illustrating a remote control device according to an embodiment of the present disclosure.
Figure 3:
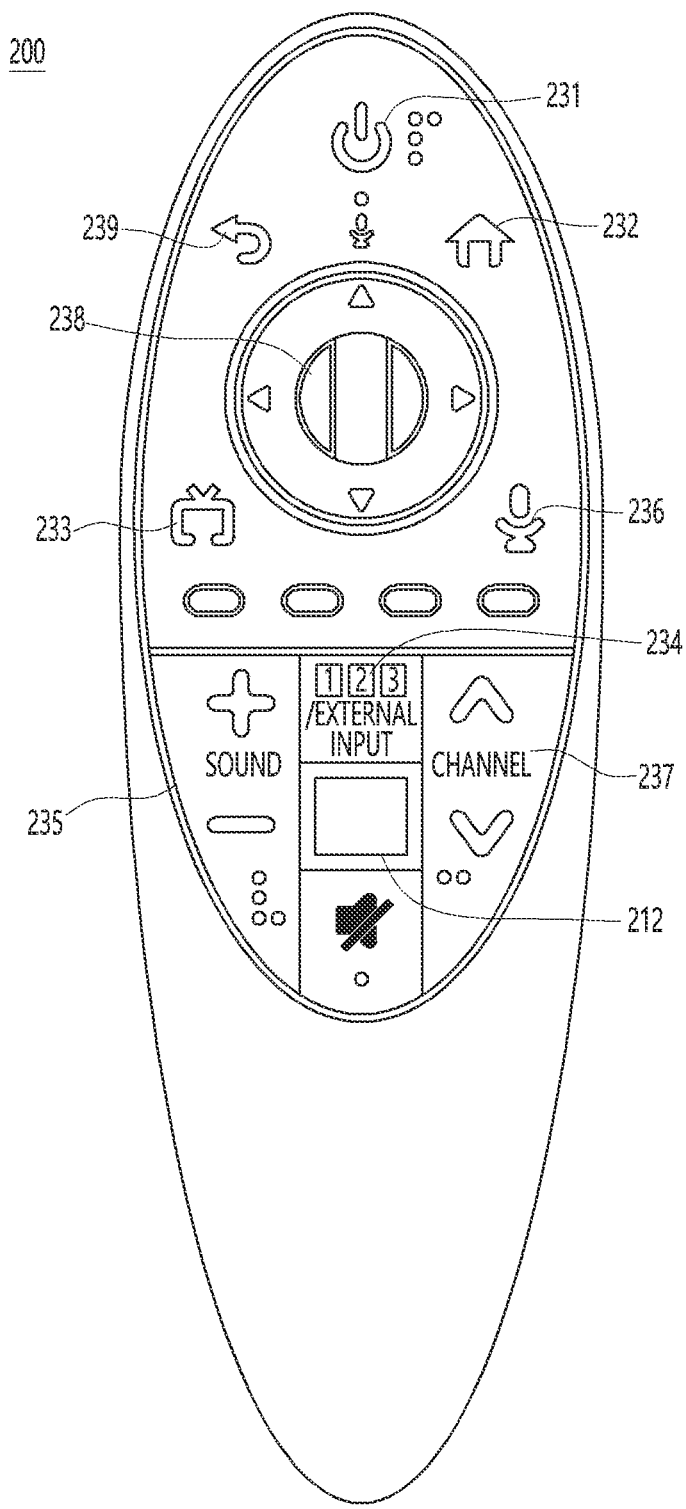
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
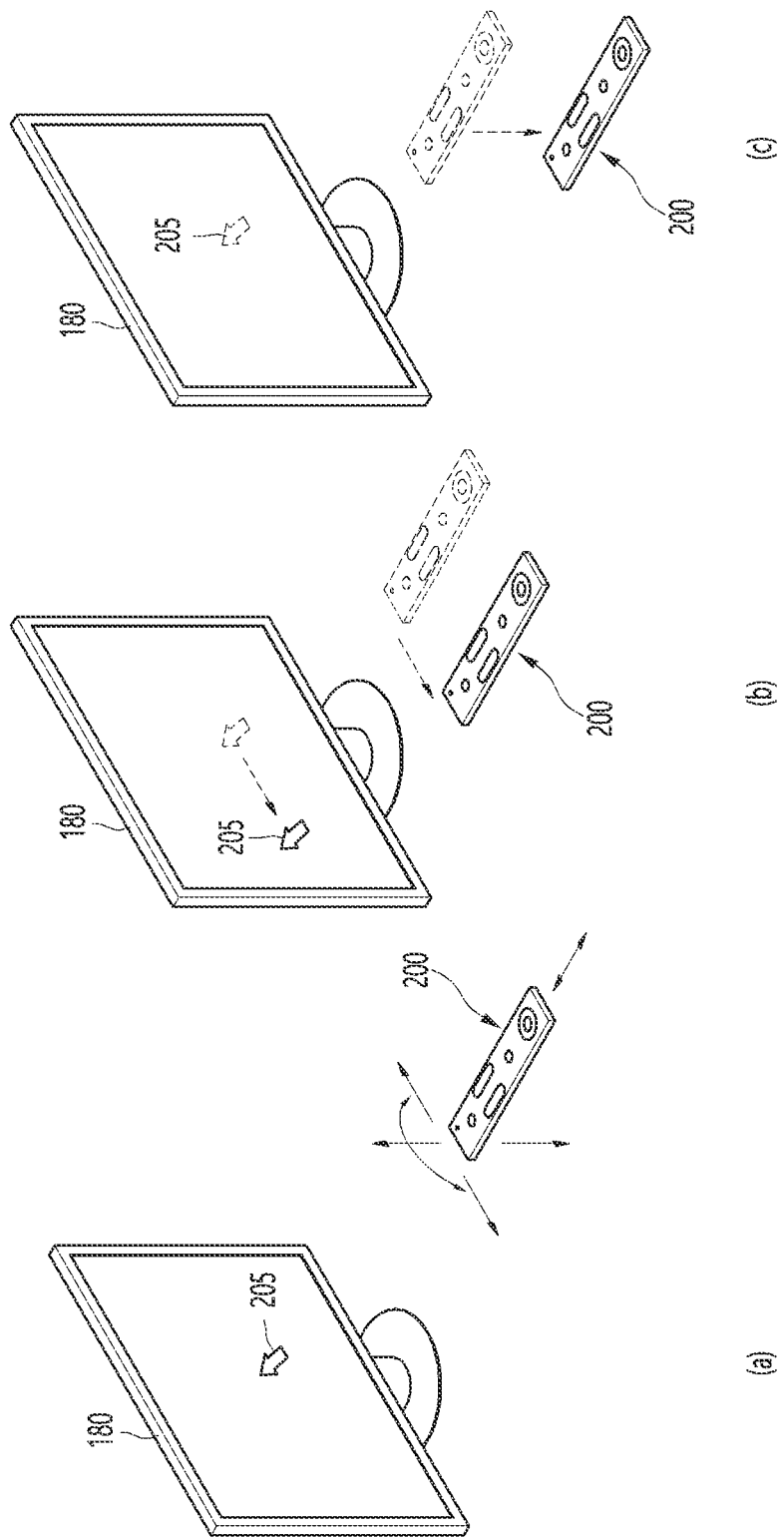
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
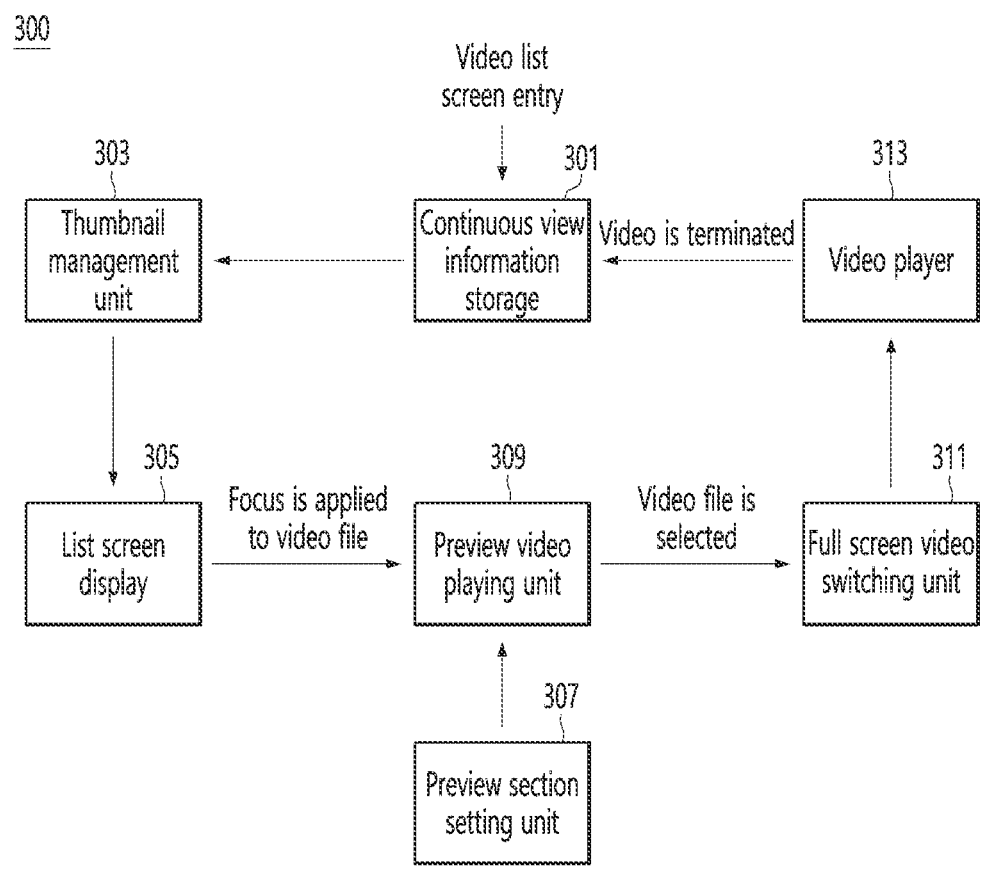
FIG. 5 is a block diagram of a video list display module of a display device according to an embodiment of the present disclosure.

FIG. 5 is a block diagram of a video list display module of a display device according to an embodiment of the present disclosure.

The display device 100 may include a video list display module 300. The video list display module 300 may be a part of the controller 170.

The video list display module 300 may be driven when displaying a list of videos stored in the storage 140, a list of videos stored in an external device connected through the external device interface 135, and the like.

The video list display module 300 may include all or at least some of a continuous view information storage 301, a thumbnail management unit 303, a list screen display 305, a preview section setting unit 307, a preview video playing unit 309, a full-screen video switching unit 311, and a video player 313.

The continuous view information storage 301 may store past playback information of each video.

Past playback information may refer to information related to previous playback when a video has been played. The past playback information may include a last playback time point of the video.

The last playback time point may refer to a playback time point at which a video was last played. For example, when a video having a total playback time of 1 hour 50 minutes 35 seconds (01:50:35) being played is stopped at 50 minutes 20 seconds (00:50:20), the last playback time point may be 00:50:20. As another example, when playing of a video having a total playback time of 1 hour 50 minutes 35 seconds (01:50:35) is completed, the last playback time point may be 01:50:35.

Completion of playing of a video may mean that the video is played up to an end time, and thus, playing of the video is automatically terminated.

The continuous view information storage 301 may store past playback information when the video is stopped during playback or when playing of the video is completed.

According to an embodiment, the continuous view information storage 301 may have a separate storage space distinguished from the storage 140. In this case, the continuous view information storage 301 may store past playback information in the internal storage space when the video is stopped during playback or playing of the video is completed.

According to another embodiment, the continuous view information storage 301 may store past playback information in the storage 140 when the storage 140 and the video are stopped during playback or playing of the video is completed.

Also, the continuous view information storage 301 may obtain past playback information when entering a video list screen. The continuous view information storage 301 may obtain past playback information from the internal storage space or the storage 140.

The thumbnail management unit 303 may obtain a preview video and a representative frame to be displayed as thumbnails corresponding to respective video items.

When the thumbnail management unit 303 receives the past playback information from the continuous view information storage 301, a preview video based on the past playback information of the video may be obtained. When the past playback information does not exist, the thumbnail management unit 303 may obtain a preview video based on a preset playback position of the video.

The representative frame may be one scene of the preview video. For example, the representative frame may be a frame corresponding to a first scene of the preview video.

The list screen display 305 may control the display 180 to display a video list including at least one video item. Each of the video items constituting the video list may include a thumbnail, and the thumbnail may be a preview video or a representative frame determined by the thumbnail management unit 303.

A thumbnail may be a preview video or a representative frame. The thumbnail may be switched from the preview video to the representative frame or from the representative frame to the preview video. For example, the list screen display 305 may display a representative frame of each video as a thumbnail of each video item, and when any one video item is focus-applied through the pointer 205, a preview video, instead of a representative frame, may be displayed as a thumbnail.

The preview section setting unit 307 may obtain a section of the preview video to be displayed as a thumbnail. The preview section setting unit 307 may obtain a section to be played as a preview video in the video corresponding to the video item to which the focus is applied through the pointer 205.

The preview video playing unit 309 may play a video of the section obtained by the preview section setting unit 307. Specifically, the preview video playing unit 309 may load only a video of the section obtained by the preview section setting unit 307 in the video stored in the storage 140 or an external device connected through the external device interface 135 and repeatedly play the video at the thumbnail position.

The full-screen video switching unit 311 may control the display 180 to display a selected video in full screen when a command for selecting the video of which one section is being played by the preview video playing unit 309.

The full-screen video switching unit 311 may switch the video being displayed in the thumbnail mode to the full screen mode.

The video player 313 may load the video stored in the storage 140 or an external device connected through the external device interface 135 and play the loaded video in full screen.

The continuous view information storage 301 may store past playback information when the video player 313 terminates playing of the video.

Meanwhile, each of the specific components constituting the video list display module 300 shown in FIG. 5 is merely distinguished to explain the operation method of the video list display module 300. That is, each of the specific components constituting the video list display module 300 may exist as separate components or may exist as a combination of two or more components.

When receiving a video list display command, the video list display module 300 may display a video list by displaying a preview video, which is a partial section of the video, as a thumbnail of the video item.

Figure 6:
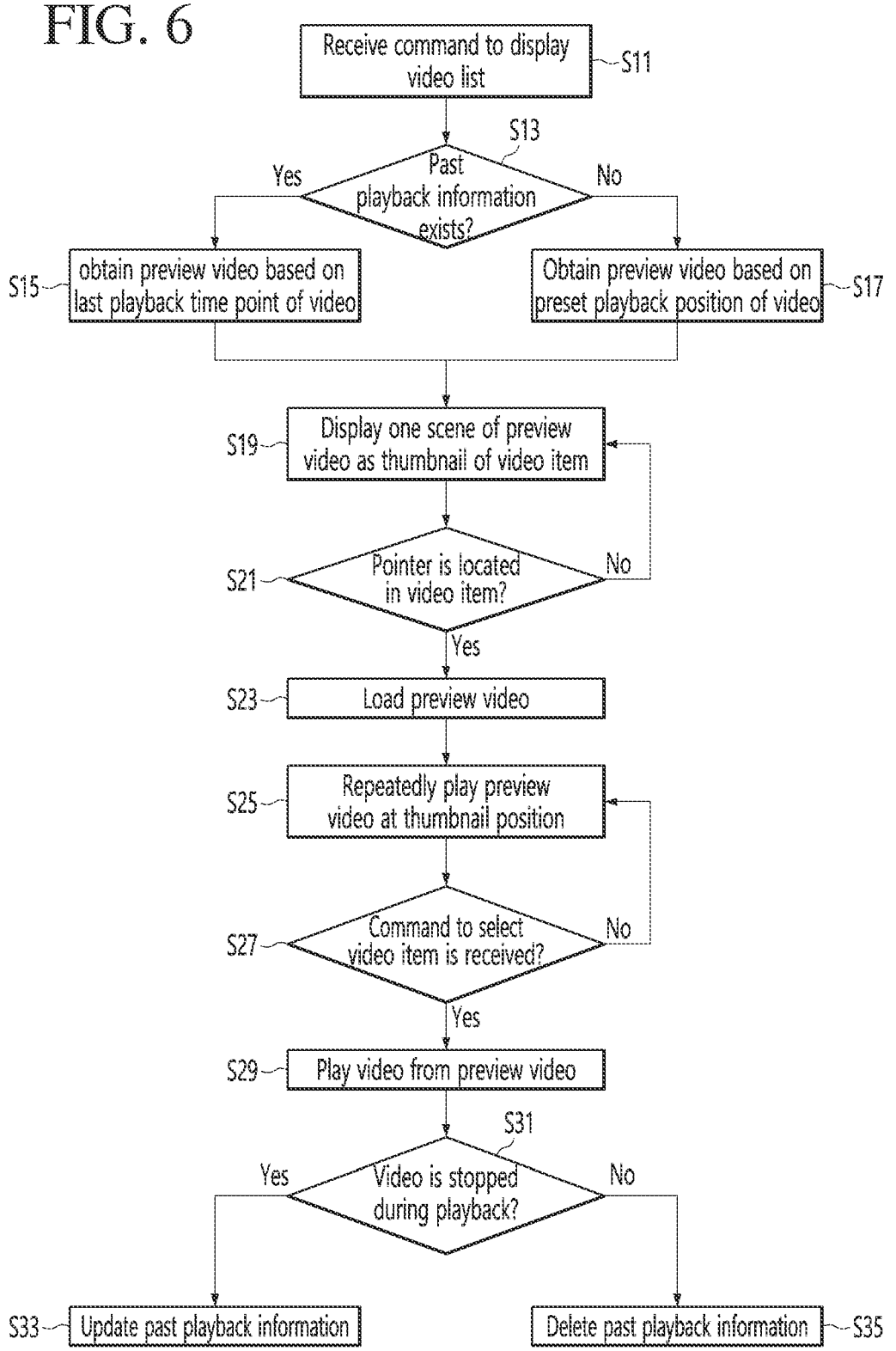
FIG. 6 is a flowchart illustrating a method of displaying a video list by a display device according to an embodiment of the present disclosure.

FIG. 6 is a flowchart illustrating a method of displaying a video list by a display device according to an embodiment of the present disclosure.

The controller 170 may receive a display command of a video list (S11).

According to an embodiment, the controller 170 may receive a command to display a video list from the remote control device 200 through the user input interface 150. In this case, the command to display a video list may be a command to display at least one video item stored in the storage 140 or a command to display at least one video item stored in an external device (not shown).

According to another embodiment, the controller 170 may receive a command to display a video list as connection of the external device (not shown) is detected through the external device interface 135. In this case, the command to display a video list may be a command to display at least one video item stored in the external device (not shown).

However, the above example is merely exemplary for convenience of description, and the controller 170 may receive a command to display a video list in various manners.

When receiving the command to display the video list, the controller 170 may determine whether past playback information exists (S13).

The controller 170 may determine whether past playback information exists for each of the video items included in the video list.

That is, the controller 170 may perform each of steps S15, S17, and S19, which will be described later, for each video.

If there is past playback information of the video, the controller 170 may obtain a preview video based on a last playback time point of the video (S15).

This is because, when the past playback information of the video exists, the controller 170 may obtain the last playback time point of the video from the past playback information.

Next, a method of obtaining a preview video by a display device based on past playback information of a video according to various embodiments of the present disclosure will be described.

Figure 7:
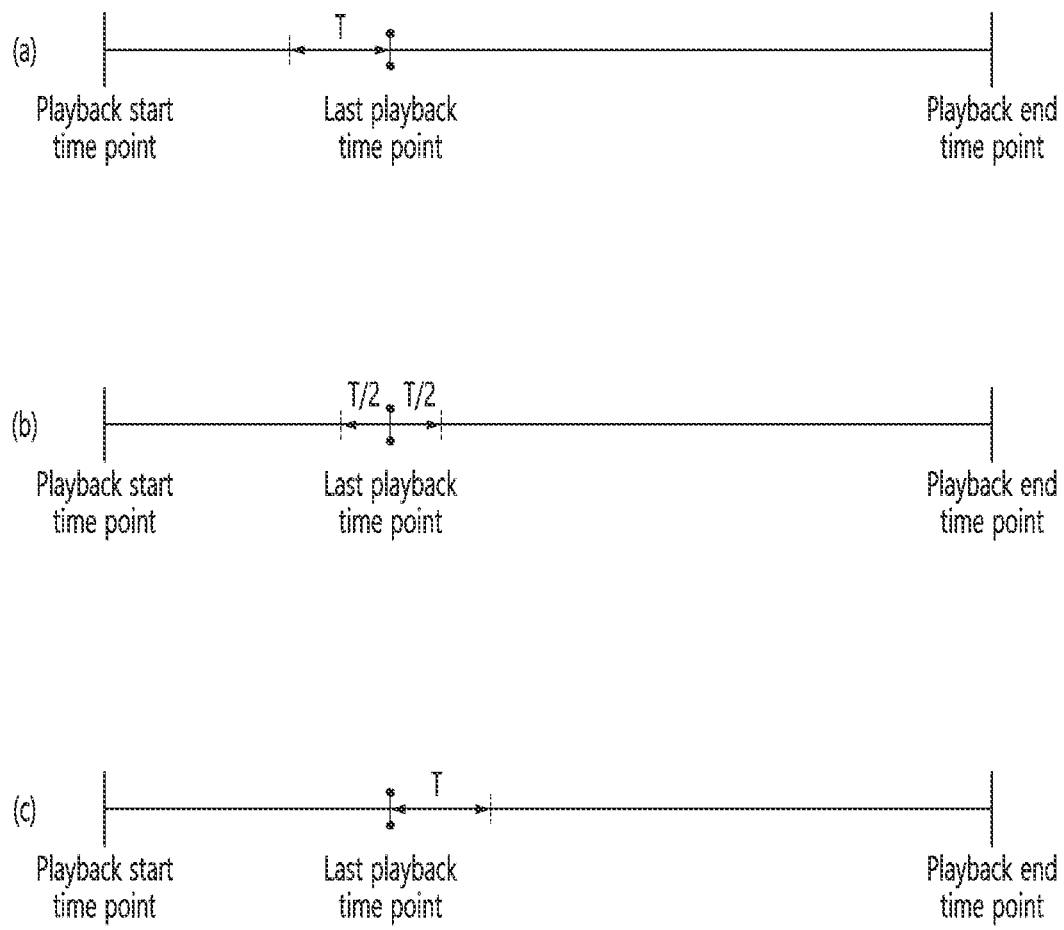
FIG. 7 is a view illustrating a method of obtaining, by a display device, a preview video based on a last playback time point of a video according to various embodiments of the present disclosure.

FIG. 7 is a view illustrating a method of obtaining, by a display device, a preview video based on a last playback time point of a video according to various embodiments of the present disclosure.

A video may include a playback start time point and a playback end time point. The playback start time point may be 00:00:00, and the playback end time point may correspond to a total playback time of the video. For example, if the total playback time of the video is 1 hour 30 minutes 41 seconds, the playback end time point may be 01:30:41.

When the video has been previously played, the continuous view information storage 301 stores past playback information, and the past playback information may exist in the display device 100.

The past playback information may include a last playback time point, and the last playback time point may be a time point between the playback start time point and the playback end time point.

Accordingly, the controller 170 may obtain a preview video to be played for a predetermined time based on the last playback time point of the video and control the display 180 to display the obtained preview video as a thumbnail of the video.

The predetermined time may be T. For example, T may be 10 seconds, but this is merely exemplary.

T may be set as a default in the display device 100 or may be set through a user input.

Hereinafter, various methods of obtaining a preview video played for a predetermined time based on the last playback time point will be described.

56According to a first embodiment, as shown in (a) of FIG. 7, the controller 170 may obtain, as a preview video, a video played from a time before the predetermined time T to the last playback time point.

According to a second embodiment, as shown in (b) of FIG. 7, the last playback time point is a middle point and the controller 170 may obtain, as a preview video, the last playback time point played for the predetermined time T. For example, the controller 170 may obtain, as a preview video, a video played from a time before T/2 time from the last playback time point to a time after T/2 time from the last playback time point.

According to a third embodiment, as shown in (c) of FIG. 7, the controller 170 may obtain, as a preview video, a video played from the last playback time point to a time after the predetermined time T from the last playback time point.

That is, the controller 170 may obtain, as a preview video, any one of the video played from a time before the last playback time point to the last playback time point, the video played in the middle as the last playback time point for the predetermined time T, and the video played from the last playback time point to a time after the predetermined time T from the last playback time point.

Meanwhile, the above-described first to third embodiments are merely exemplary for convenience of explanation, and the controller 170 may obtain the preview video according to various methods so that the preview video is played for a predetermined time with the last playback time point.

FIG. 6 will be described again.

When there is no past playback information of the video, the controller 170 may obtain a preview video based on a preset playback position of the video (S17).

When the video has not been previously played, the continuous view information storage 301 may not store past playback information, and past playback information may not exist in the display device 100.

According to an embodiment, even if a video has been played before and playing of the video is completed, the continuous view information storage 301 may not store past playback information, and past playback information may not exist in the display device 100.

Figure 8:
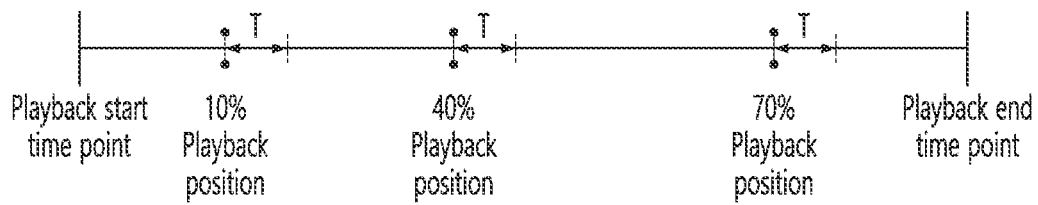
FIG. 8 is an exemplary view illustrating a method of obtaining a preview video when there is no past playback information in the display device according to an embodiment of the present disclosure.

FIG. 8 is an exemplary view illustrating a method of obtaining a preview video when there is no past playback information in the display device according to an embodiment of the present disclosure.

The controller 170 may obtain a preview video based on a preset playback position of a video. Specifically, the controller 170 may obtain, as a preview video, a video played for a predetermined time from a playback position corresponding to a set ratio (N %) in the total playback time of the video.

Referring to the example of FIG. 8, the controller 170 may obtain, as a preview video, a video played for a predetermined time T from a playback position corresponding to 10% of the total playback time of the video. Alternatively, the controller 170 may obtain, as a preview video, a video played for the predetermined time T from a playback position corresponding to 40% of the entire playback time of the video. Alternatively, the controller 170 may obtain, as a preview video, a video played for the predetermined time T from a playback position corresponding to 70% of the total playback time of the video. Alternatively, the controller 170 may obtain, as a preview video, a video in which a video from a playback position corresponding to 10% of the total playback time of the video to the predetermined time T, a video from a playback position corresponding to 40% of the total playback time of the video to the predetermined time T, and a video from a playback position corresponding to 70% of the total playback time of the video to the predetermined time T are sequentially played.

However, the above method is merely exemplary, and the controller 170 may obtain the preview video in various manners.

Again, FIG. 6 will be described.

The controller 170 may obtain a preview video and display one scene of the preview video as a thumbnail of a video item (S19).

The controller 170 may extract at least one frame from the preview video and display a scene corresponding to the extracted frame as a thumbnail of a video item.

The controller 170 may obtain a position of the pointer 205 in a video item (S21).

The controller 170 may determine in which one of the video items included in the video list the pointer 205 is located.

When the pointer 205 is located on the video item, the controller 170 may load a preview video (S23).

The controller 170 may load only a section corresponding to the preview video in the video corresponding to the video item in which the pointer 205 is located from a storage location of the video.

The controller 170 may repeatedly play the preview video at the thumbnail position (S25).

The controller 170 may load only the section corresponding to the preview video in the video and control the display 180 to play and display the preview video at the thumbnail position.

In this case, the display device 100 has an advantage in that it is not necessary to store the video or a specific frame used as a thumbnail.

The controller 170 may determine whether a command to select a video item is received (S27).

The controller 170 may obtain whether a command to select a video item by the pointer 205 is received.

If a command to select a video item is not received and the pointer 205 continues to be located on the video item, the controller 170 may repeatedly play the preview video.

Meanwhile, when receiving a command to select a video item, the controller 170 may play the video from the preview video (S29).

According to an embodiment of the present disclosure, unlike the case shown in FIG. 6, when a command to select a video item is received, the controller 170 may play a video corresponding to a selected video item from the playback start time point.

However, according to another embodiment of the present disclosure, as shown in FIG. 6, when a command to select a video item is received, the controller 170 may play the video corresponding to the selected video item from the preview video.

Meanwhile, even when the video is played from the preview video, from which point in the preview video the video is to be played may vary according to embodiments.

According to a first embodiment, the controller 170 may play the video from a first frame of the preview video.

According to a second embodiment, the controller 170 may play the video from a last playback time point of the preview video.

According to a third embodiment, the controller 170 may play the video from a center time point of the preview video.

According to a fourth embodiment, the controller 170 may play the video from the last frame of the preview video.

Meanwhile, the first to fourth embodiments described above are only given as examples for convenience of explanation, and the controller 170 may play a video by selecting at least one view point in the preview video in various manners.

The controller 170 may select a playback start time point differently according to a method of obtaining the preview video.

The controller 170 may obtain whether the video is stopped during playback (S31).

Here, when the video is stopped during playback, it may mean that the playback is terminated before the video is played until a playback end time point.

If the video is stopped during playback, the controller 170 may update the past playback information (S33).

For example, if the last playback time point of the existing last playback information is 00:30:14 and the video is stopped at 01:00:13 during playback, the controller 170 may change the last playback information from 00:30:14 to 01:00:13. That is, when the video is stopped during playback, the controller 170 may update the last playback information by changing the last playback time point of the video.

When the last playback time point of the video is changed, the controller 170 may change the preview video.

Specifically, following the example above, the controller 170 may change the preview video from the video based on the last playback time point of 00:30:14 to a video based on the last playback time point of 01:00:13.

Also, when the last playback time point of the video is changed, the controller 170 may change the thumbnail. That is, since the thumbnail is a preview video or a scene of the preview video, the controller 170 may change the thumbnail while changing the last playback time point.

Meanwhile, if the video is not stopped during playback, the controller 170 may delete the past playback information (S35).

Here, when the video is not stopped during playback, it may mean that the playback is automatically terminated as the video is played until the playback end time point.

If the video is not stopped during playback, the controller 170 may delete the past playback information, and in this case, similarly, the controller 170 may change the preview video and the thumbnail.

Figure 9:
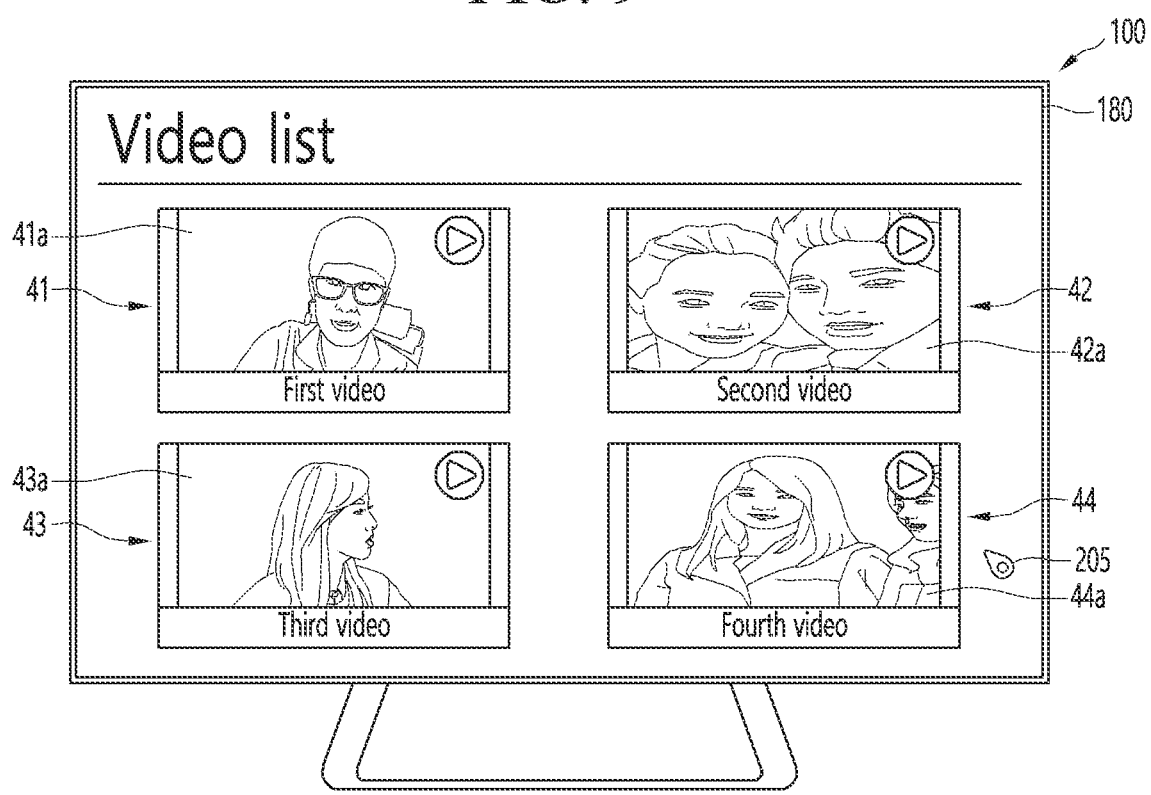
FIG. 9 is an exemplary view illustrating a method of displaying a video list by a display device according to an embodiment of the present disclosure.

FIG. 9 is an exemplary view illustrating a method of displaying a video list by a display device according to an embodiment of the present disclosure.

After obtaining the preview video, the controller 170 may control the display 180 to display a list of videos in which one scene of the preview video is used as a thumbnail.

Referring to the example of FIG. 9, the controller 170 may control the display 180 to display a video list including the first to fourth video items 41 to 44. Each of the first to fourth video items 41 to 44 may have a thumbnail position.

Also, in the example of FIG. 9, since the pointer 205 is not located in the video item, the thumbnail may be a scene in the preview video.

Accordingly, the controller 170 may control the display 180 to display, as a thumbnail, a scene 41*a* of a preview video of the first video at a thumbnail position of the first video item 41, a scene 42*a* of a preview video of the second video at a thumbnail position of the second video item 42, a scene 43*a* of a preview video of the third video at a thumbnail position of the second video item 43, and a scene 44*a* of a preview video of the fourth video at a thumbnail position of the second video item 44.

In this case, the preview video may be a video obtained based on past playback information, and in this case, one scene displayed as the thumbnail may be a scene at the last playback time point according to the past playback information or a scene adjacent to the last playback time point. Accordingly, there is an advantage in that the user may easily recognize the contents of the video corresponding to each video item by viewing only the thumbnail.

Figure 10:
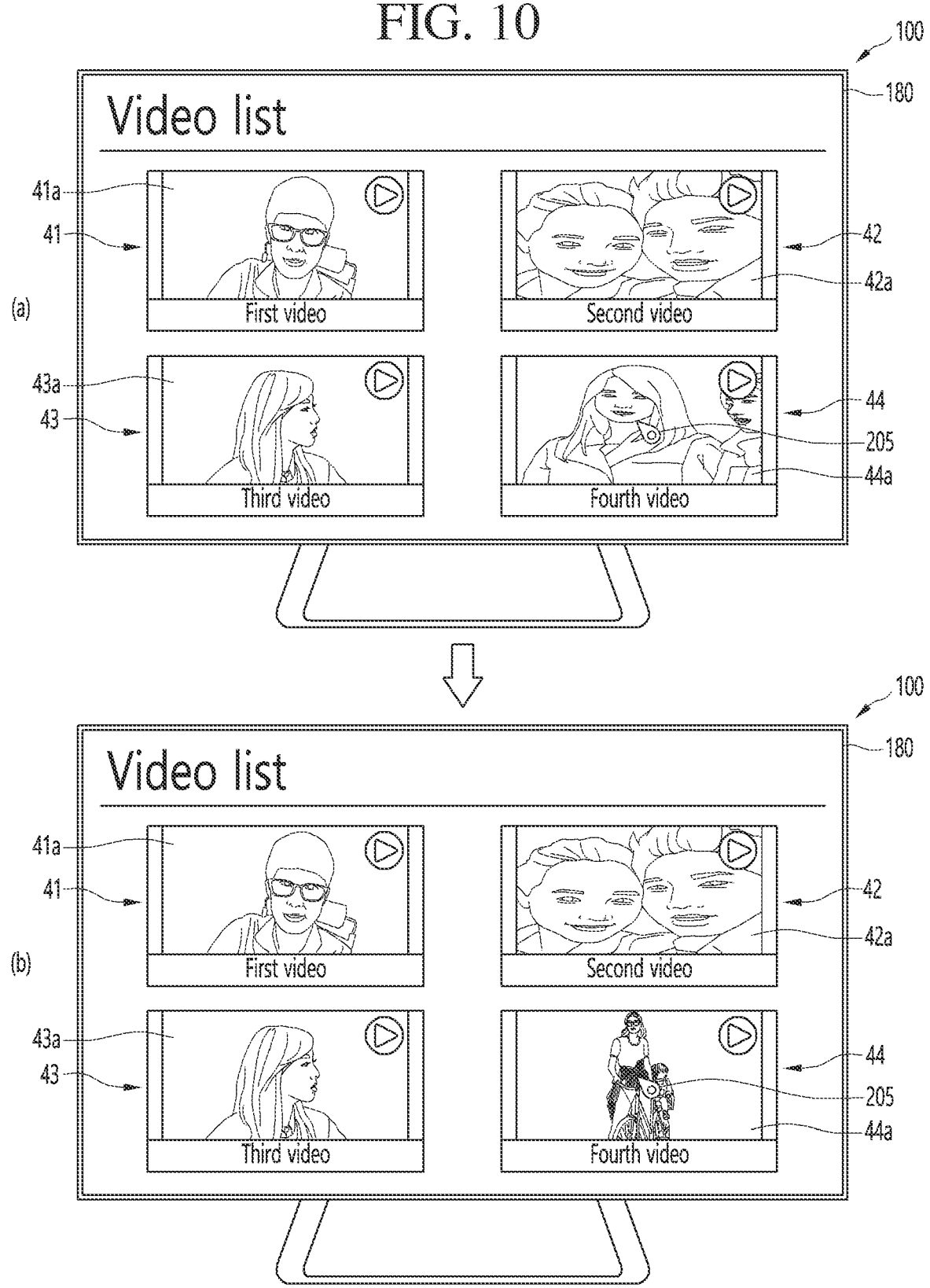
FIG. 10 is an exemplary view illustrating a method of displaying a preview video as a thumbnail when a display device displays a video list according to an embodiment of the present disclosure.

FIG. 10 is an exemplary view illustrating a method of displaying a preview video as a thumbnail when a display device displays a video list according to an embodiment of the present disclosure.

In a state in which the video list including the first to fourth video items 41 to 44 is displayed, the controller 170 may detect whether the pointer 205 is located in any one of the first to fourth video items 41 to 44. When the pointer 205 is located in any one of the first to fourth video items 41 to 44, the controller 170 may play a preview video at the thumbnail position of the video item in which the pointer 205 is located.

That is, referring to the example of FIG. 10, the controller 170 may detect that the pointer 205 is located in the fourth video item 44 in (a) of FIG. 10 and control the display 180 to repeatedly play and display a preview video of the fourth video as a thumbnail of the fourth video item 44.

As described above, when the preview video is played at the thumbnail position, there is an advantage that the user may easily recognize that a file corresponding to the corresponding video item is a dynamic media file.

In addition, since the user views the preview video based on the last playback time point through the thumbnail, there is an advantage in that the user may recall the previously viewed scene without playing it.

Figure 11:
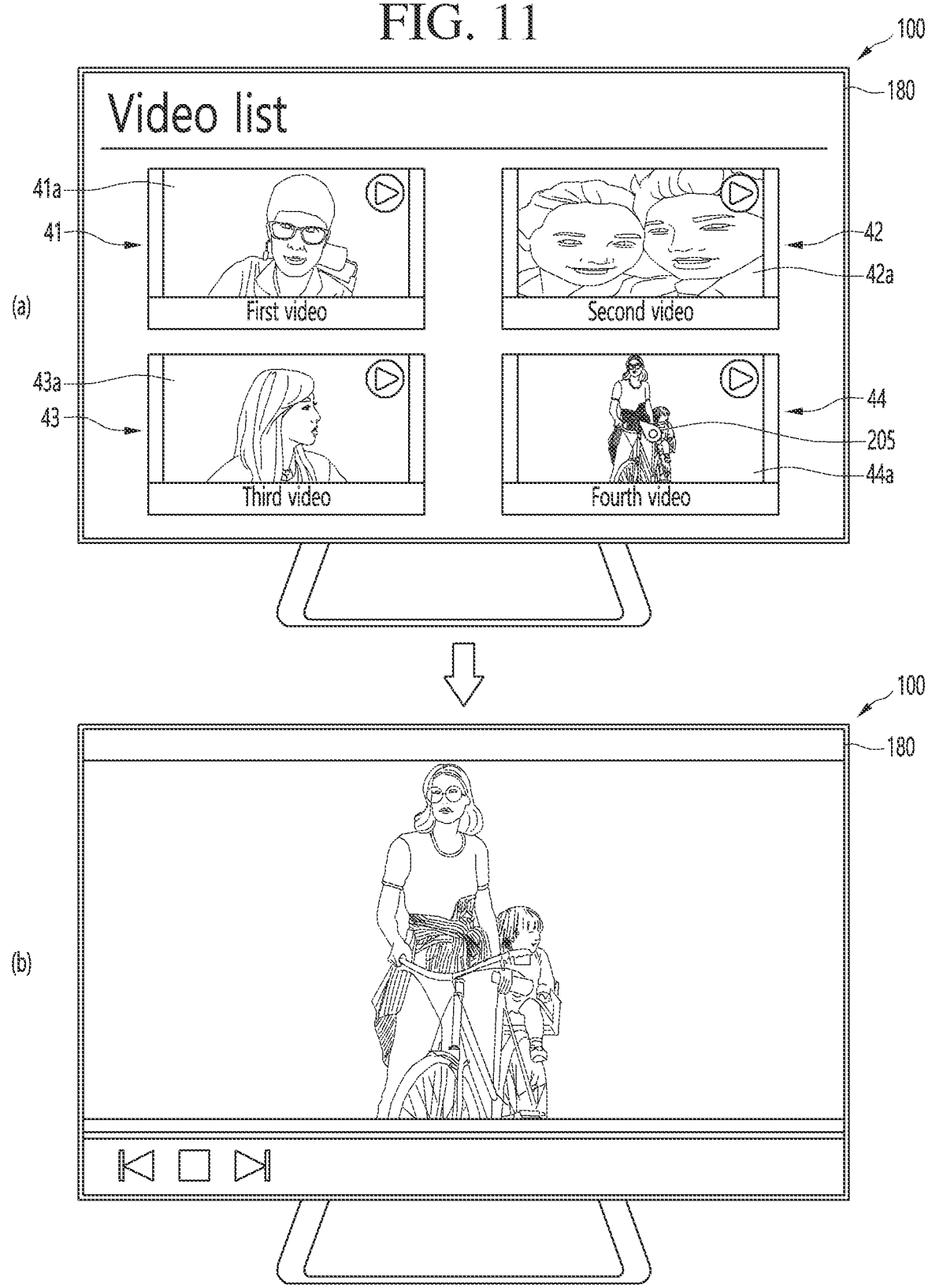
FIG. 11 is an exemplary view illustrating a method of displaying, by a display device, a video when a video item is selected from a video list according to an embodiment of the present disclosure.

FIG. 11 is an exemplary view illustrating a method of displaying, by a display device, a video when a video item is selected from a video list according to an embodiment of the present disclosure.

Referring to (a) of FIG. 11, as described above, the controller 170 may display a preview video of a corresponding video by the thumbnail corresponding to the video item 44 in which the pointer 205 is located.

The controller 170 may receive a command to select the corresponding video item 44 with the pointer 205 in a state in which the preview video is played as a thumbnail of the video item 44 in which the pointer 205 is located.

In this case, as shown in (b) of FIG. 11, the controller 170 may play a video from the preview video being displayed as a thumbnail. That is, the controller 170 may play the video from a time point corresponding to the preview video being played as a thumbnail.

Specifically, when the video item 44 is selected by the pointer 205, the controller 170 may switch a playback mode of the preview video from a thumbnail mode to a full screen mode. That is, the preview video of the fourth video is played in the thumbnail mode in FIG. 11(a), and in this state, when the video item 44 is selected by the pointer 205, the controller 170 may play the fourth video in the full screen mode as shown in (b) of FIG. 11.

When the preview video of the fourth video is switched from the thumbnail mode to the full screen mode and played, the controller 170 may not play the preview video repeatedly and may continuously play the fourth video continued from the preview video as soon as the preview video is terminated.

The controller 170 may repeatedly play the preview video only in the thumbnail mode as shown in (a) of FIG. 11, and in the full-screen mode the controller 170 may play the whole video from the preview video as shown in (b) of FIG. 11.

As described above, according to an embodiment of the present disclosure, when a video selected through a thumbnail is played, the already loaded preview video is immediately played, so that there is no need to load anew video at an video selection time point. Accordingly, there is an advantage in that the video may be smoothly switched to the full screen and buffering may be minimized at the start of video playback.

FIG. 12 is an exemplary view illustrating a method for changing a thumbnail by a display device when a video is stopped during playback according to an embodiment of the present disclosure.

(c) of FIG. 12 shows a state in which a predetermined time has elapsed after the video starts to be played in full screen in FIG. 11(b).

As shown in (c) of FIG. 12, the controller 170 may receive a stop command through the pointer 205 during playback of the video. When the video is stopped during playback, the controller 170 may change the last playback time point of the video to a playback time point when the stop command is received. In this case, the controller 170 may change the preview video and the thumbnail based on the changed last playback time point.

It can be seen that the thumbnail of the fourth video item 44 shown in (a) of FIG. 11 is different from the thumbnail of the fourth video item 44 shown in (d) of FIG. 12. That is, as shown in (d) of FIG. 12, the controller 170 may change the thumbnail of the fourth video item 44 based on the changed last playback time point.

As described above, according to the present disclosure, by changing the thumbnail of the video list based on the user's last viewing time, there is an advantage in that the user may more easily recognize the contents of the video by viewing only the thumbnail.

Figure 13:
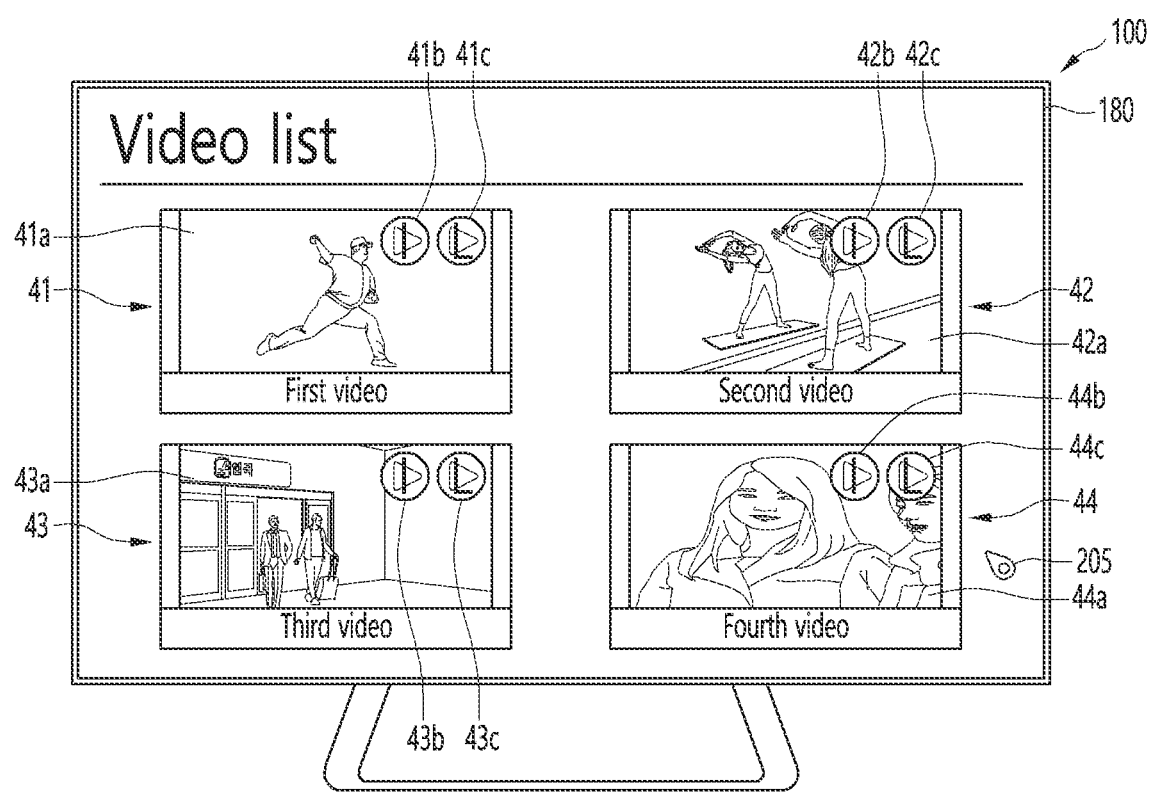
FIG. 13 is an exemplary view illustrating a method of displaying a video list according to another embodiment of the present disclosure.

FIG. 13 is an exemplary view illustrating a method of displaying a video list according to another embodiment of the present disclosure.

According to another embodiment of the present disclosure, the controller 170 may control the display 180 to display a plurality of playback icons when displaying a video list.

Specifically, the controller 170 may control the display 180 to display at least one of a first icon for playing a video from the beginning and a second icon for playing a video from a preview video on each video item.

Referring to the example of FIG. 13, the controller 170 may control the display 180 to display a first icon 41b and a second icon 41c on the thumbnail of the first video item 41, a first icon 42b and a second icon 42c on the thumbnail of the second video item 42, a first icon 43b and a second icon 43c on the thumbnail of the third video item 43, and a first icon 44b and a second icon 44c on the thumbnail of the fourth video item 44.

When a command for selecting the first icon 41b of the first video item 41 is received, the controller 170 may play the first video from the beginning, and when a command for selecting the second icon 41c of the first video item 41, the controller 170 may play the first video from the preview video of the first video. Similarly, when a command for selecting the first icon 42b of the second video item 42 is received, the controller 170 may play the second video from the beginning, and when a command for selecting the second icon 42c of the second video item 42, the controller may play the second video from the preview video of the second video. The third and fourth video items 43 and 44 also operate in the same manner, and overlapping descriptions will be omitted.

In this case, there is an advantage that the user may easily select a viewing point by using the first icon and the second icon.

Meanwhile, according to another embodiment of the present disclosure, the controller 170 may control the display 180 to display the first and second icons only on a video item in which past playback information exists, and display only the first icon in a video item in which past playback information does not exist.

The presence of past playback information means that the user has watched it before, providing an opportunity for the user to select the playback time as the first or last playback time point, and when the past playback information does not exist, the second icon is not displayed, thereby reducing user confusion by minimizing a case in which a video is played from an arbitrary time point not predicted by the user.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A display device comprising:
    a display; and
    a controller configured to:
    display a video list including at least one video item, with each of the at least one video item corresponding to a respective video,
    control the display to display a video item of the at least one video item in a thumbnail mode, with a first thumbnail representing a first preview video based on a first, last playback time of the video corresponding to the video item,
    in response to a first selection of the video item, switch from the thumbnail mode to a full screen mode and play the video of the video item in full screen on the display, in response to a command to stop playing video during playback of the video;
  change the first, last playback time of the video to a second, last playback time when the command to stop playing video is received, and
  change the first preview video to a second preview video and the first thumbnail to a second thumbnail based on the second, last playback time,
play the second preview video at a position of the second thumbnail, and
in response to a second selection of the video item while the second preview video is being played in the thumbnail mode, play the video in full screen from the second, last playback time.

2. The display device of claim 1, wherein the controller is further configured to:
  in response to a non-existence of the last playback information, control the display to display a second thumbnail representing a second preview video played from the playback start time point position of the video.

3. The display device of claim 1, wherein the controller is further configured to:
  control the display to display the first thumbnail as a still frame of a scene being played when the command to stop playing video is received, and
  play the video in full screen from the still frame of the scene when the selection of the video item is received.

4. The display device of claim 1, wherein the controller is further configured to:
  in response to a pointer being placed on the video item, control the display to switch from the thumbnail mode to the full screen mode and play the video in full screen on the display.

5. The display device of claim 1, wherein, when switching from the thumbnail mode to the full screen mode, the controller is further configured to:
  continuously play the video following the first preview video being played at a position of the first thumbnail.

6. The display device of claim 1, wherein the controller is further configured to:
  when the video has not been played or playing of the video is completed, obtain the first preview video based on a playback start time point of the video.

7. The display device of claim 1, wherein the controller is further configured to play the first preview video at a position of the first thumbnail or display a still frame of a scene included in the first preview video.

8. The display device of claim 1, wherein the controller receives the command to stop playing video through a home button or a back button included in a remote control device.

9. The display device of claim 1, wherein the controller receives the first selection of the first thumbnail through a check button included in a remote control device.

10. The display device of claim 1, wherein the controller plays the first preview video at a position of the first thumbnail when video item corresponding to the first thumbnail is focus-applied.

* * * * *